United States Patent [19]
Krahn et al.

[11] Patent Number: 5,968,359
[45] Date of Patent: Oct. 19, 1999

[54] BIOTECHNOLOGICAL PURIFICATION OF SOIL AND WATER CONTAINING HEAVY METALS

[76] Inventors: Roland Krahn, Merianweg 28, D-40724 Hilden; Rolf-Dieter Henkler, Hädelstrasse 30, D-40593 Düsseldorf; Walter Ensslin, Comenuisweg 10, D-40723 Hilden; Ulli Bartsch, Muschelkweg 3, D-42781 Haan, all of Germany

[21] Appl. No.: 08/860,787
[22] PCT Filed: Jan. 5, 1996
[86] PCT No.: PCT/EP96/00027
  § 371 Date: Oct. 27, 1997
  § 102(e) Date: Oct. 27, 1997
[87] PCT Pub. No.: WO96/20797
  PCT Pub. Date: Jul. 11, 1996

[30] Foreign Application Priority Data

Jan. 5, 1995 [DE] Germany .......................... 195 00 229

[51] Int. Cl.⁶ .................. C02F 3/00; C02F 3/34
[52] U.S. Cl. ............. 210/601; 210/610; 210/611; 210/616; 210/912; 210/747; 435/174; 435/262.5; 405/128
[58] Field of Search ............. 210/610, 611, 210/747, 601, 602, 912–914, 616, 617, 615; 405/128; 435/174, 262.5, 176, 177

[56] References Cited

U.S. PATENT DOCUMENTS

| | | | |
|---|---|---|---|
| 4,108,722 | 8/1978 | Stover | 195/1 |
| 4,124,501 | 11/1978 | Yen et al. . | |
| 4,354,937 | 10/1982 | Hallberg . | |
| 4,522,723 | 6/1985 | Kauffman et al. . | |
| 4,668,388 | 5/1987 | Dibble et al. . | |
| 4,678,582 | 7/1987 | Lavigne . | |
| 4,690,894 | 9/1987 | Brierley et al. | 210/601 |
| 4,698,224 | 10/1987 | Nakanishi et al. . | |
| 4,789,478 | 12/1988 | Revis et al. . | |
| 5,055,402 | 10/1991 | Greene et al. . | |
| 5,084,389 | 1/1992 | Lakshmanan et al. | 210/616 |
| 5,263,795 | 11/1993 | Corey | 405/128 |
| 5,275,943 | 1/1994 | DiTuro . | |
| 5,334,533 | 8/1994 | Colasito et al. . | |
| 5,355,594 | 10/1994 | Hwang . | |
| 5,506,096 | 4/1996 | Helmo . | |
| 5,538,645 | 7/1996 | Yannai et al. | 210/912 |
| 5,738,789 | 4/1998 | Shugina | 210/610 |

FOREIGN PATENT DOCUMENTS

WO 94/02211  2/1994  WIPO .

OTHER PUBLICATIONS

Dvorak et al, Biotech.Bioeng., 1992, 40:609.
Huber et al., Biotechnology, 1986, vol. 8, pp. 297–301.
Hardwick, Biotechnology, 1983 vol. 5, pp. 208–211.
van der pas, Korrespondez Abwasser, 1986, pp. 916–917.
Van Haecht et al., Cerevisia, 1995, 20: 51.
"Sulphur, No. 325, Nov. 1994 –Dec. 1994, London, GB, pp. 59–69, XP002001674 'Exploiting Nature's Sulphur Cycle', p. 59 see Fig. 1".

*Primary Examiner*—Richard L. Chiesa
*Assistant Examiner*—Fred Prince
*Attorney, Agent, or Firm*—Sprung Kramer Schaefer & Briscoe

[57] ABSTRACT

In a method of cleaning up heavy metal-laden waters and soils, conditions are established in the soils and waters to be treated so that the microorganism present there will form hydrogen sulfide, and optionally apathogenic facultative anaerobes that are tolerant of heavy metals are added to produce hydrogen sulfide, and the hydrogen sulfide formed by microbiological action is allowed to react with the heavy metals to form metal sulfides.

6 Claims, No Drawings

BIOTECHNOLOGICAL PURIFICATION OF SOIL AND WATER CONTAINING HEAVY METALS

The invention concerns a method of cleaning up heavy metal-laden soils and waters using microorganisms.

It is known that soil containing heavy metals is bagged and dumped or deposited only after being mixed with concrete or after a thermal treatment (vitrification). Heavy metal dumps are protected from leaching due to water penetrating at the sides by installing sheet pilings. However, no safe long-term storage is guaranteed due to the dumping of soluble heavy metal compounds, so they constitute a permanent risk.

For cleaning up water polluted with heavy metals, it is possible to precipitate iron hydroxide by adding iron sulfate and milk of lime, and bind it to the heavy metal by adsorption to iron hydroxide and separate it. However, a disadvantage here is that wastewater purification is performed only when the heavy metal content is medium to high, because it is a cost-intensive process with a high consumption of chemicals. To achieve extensive adsorption of heavy metals, it would be necessary to use large quantities of precipitating agents, which would subsequently have to be dumped with heavy metals at a great expense. This leads to a considerable increase in volumes and quantities for disposal.

In U.S. Pat. No. 4,789,478 a method for treating waters containing heavy metals is disclosed, in which *Citrobacter freundii* is used. This microorganism is classified in Risk Group 2 in the Genetic Technology Safety Ordinance (GenTSV), and so it can cause illness in humans. The temperature range and the narrow pH range in which this microorganism produces its effect is disadvantageous. It is furthermore intolerant of large concentrations of heavy metals, so that it cannot be used for cleaning up soils contaminated with heavy metals.

WO-A-94/02211 describes a decontamination process for soils contaminated with organic metal compounds wherein, starting with anaerobic conditions in the soil growth of sulfate reducing bacteria is stimulated by the repeated administration of nutrients, especially a carbon source. In particular, this state of the art proposes the addition of yeast extract as part of the nutrient solution. The sulfate reducing bacteria indirectly cleave the organometals by producing hydrogen sulfide. This reacts with the organometals to form metal sulfides. This process, however, is very slow and is inhibited by pH levels below pH 5 and high heavy metal concentrations.

The invention is therefore addressed to the problem of preventing the leaching out of toxic heavy metals into the ground water or their ascent into the upper layers of the soil without the need for coffering out old pollution and of purifying water contaminated with heavy metals in a wide range of concentration, temperatures and pH, without the need to fear the occurrence of illness due to microorganisms.

This problem is solved by a method for decontaminating water and soils contaminated with heavy metals, by establishing conditions in soils and waters by the addition of yeast under which the microorganisms present therein form a hydrogen sulfide and causing the hydrogen sulfide to react with the heavy metals to produce metal sulfides.

By the controlled biological formation of hydrogen sulfide the site of the heavy metals.

The object of this invention is therefore to prevent leaching of toxic heavy metals into groundwater or capillary ascent into the upper strata of soil without requiring excavation of old pollution burdens, and to purify heavy metal-laden water in a wide range of concentrations, temperatures and pH values to remove the heavy metals without any fear of an outbreak of diseases due to microorganisms.

This object is achieved by a method of cleaning up water and soil polluted with heavy metals by adjusting conditions in the water and soil to be treated so that the microorganisms present there will form hydrogen sulfide, and optionally adding apathogenic facultative anaerobes that are particularly tolerant of heavy metals to produce hydrogen sulfide, and allowing the hydrogen sulfide to react with the heavy metals to form metal sulfides.

By controlled biological formation of hydrogen sulfide in situ with the heavy metal under anaerobic conditions, it is possible according to this invention to encapsulate and immobilize heavy metals in the pollution zone, where increased production of hydrogen sulfide is actually induced by heavy metals. Then there need to be no fear of heavy metals entering the food chain. The process according to this invention also makes it possible to inexpensively clean up large areas of low-concentration heavy metal pollution.

Facultative anaerobes that are tolerant of heavy metals are, according to this invention, those having $EC_{50}$ values in the range of 10 to 1000 ppm in toxicity tests.

The sulfur source added to the soil, water or groundwater to be purified may be colloidal sulfur (wettable sulfur), sulfur dissolved in dimethyl sulfoxide, alkali sulfate or alkaline earth sulfate, thiosulfate or polysulfide. In many cases the naturally occurring levels of alkali sulfate or alkaline earth sulfate or other sulfur compounds occurring in soil or water will be sufficient.

The sulfur source may be used in the form of a solution or a slurry or in some other form.

In treatment of water polluted with heavy metal, it has been found especially advantageous to apply sulfur to the inner and outer pores of a carrier by vapor deposition and then use these sulfur-vaporized carriers. Open-pored sintered glass, for example, is a suitable carrier. According to a preferred embodiment, the carriers are inoculated with the microorganisms used according to this invention.

To induce or accelerate the process, it has proven advantageous to add oxidizable, biologically utilizable organic substances as the carbon source to ensure anaerobic conditions in their biological degradation. Such substances include, for example, molasses, acetates, lactates, glycerol, ethanol and waste from sugar beet production and beer production.

Mixtures of ammonium sodium hydrogen phosphate and magnesium sulfate as well as commercial fertilizer mixtures with the lowest possible nitrate content have proven suitable nitrogen sources and mineral nutrients.

According to an especially preferred embodiment, if no microorganisms are present in the soil to supply hydrogen sulfide, an aqueous suspension of yeast, baker's yeast, wine yeast or bottom-fermenting beer yeast (*Saccharomyces cerevisiae*) may be added. To reduce the cost of acquisition of yeast used according to this invention, it is advisable to culture it with molasses and similar sugar-based substances as an initial culture.

Yeasts have proven especially advantageous because they have a high biological activity even at low temperatures around 10° and in a pH range of 4 to 8. In particular, they are especially tolerant of heavy metals.

The progress of the clean-up can be monitored and optimized by detection of hydrogen sulfide in pumped water using an electronic probe or simply moist lead acetate paper. If there is no production of hydrogen sulfide, the reason can be determined quickly with simple laboratory agents. If hydrogen sulfide or black cobalt sulfide does not form until after the addition of yeast funguses to the pumped-up water, to which a dilute cobalt salt solution, say, 50 mg $Co^{1+}/l$, has been added, then there is a deficiency of microorganisms in the soil, which can easily be compensated by adding more of them. If despite this addition of microorganisms no hydrogen sulfide formation occurs in the soil, then the supply of nutrients, the pH, the amount of organic substances added and the content of sulfur or sulfur compounds can be tested in the laboratory and optimized.

If excessively high toxicity in the ground water prevents any biological action, the clean-up must sift to marginal areas of the dump or to grater depths where the concentration of heavy metals and other toxic substances in lower and biological decontamination is possible. This, too, leads ultimately to the encapsulation and immobilization of the heavy metals.

By increasing the input of reducing substances, such as those which are described as a source of carbon, the anaerobic decontamination zone can certainly be extended to just beneath the top strata of the soil. Under these circumstances, it is recommendable that the contaminated stratum be covered with a layer that is relatively impermeable to water and hence also to oxygen, such as a layer of clay, since heavy metal sulfides can slowly be converted to soluble sulfates microbiologically in an acid environment by the introduction of oxygen or nitrate.

By measured addition of sulfur or nutrient the danger of excessive formation of $H_2S$ is prevented. Heavy metal salts issuing from voids in the precipitation zone are precipitated by hydrogen sulfide being diffused into it, thereby sealing the leakage and achieving a complete encapsulation of the zone of contamination. The heavy metals are then in the form of sulfides as they are geological deposits, which are resistant to external influences such as seepage water. Thus sealing these heavy metal dumps on all sides is eliminated. It is furthermore advantageous that, in the biological fixation of heavy metals, as proposed by the invention, the specifically used microorganisms or microorganisms matched to the substances in the dump, also degrade other contaminants in the dump at the same time, so that a combined decontamination of several groups of contaminants becomes possible, which also applies to water or waste waters.

Sulfur or sulfur compounds, and furthermore the other previously named compounds can be put into soils contaminated with heavy metals through pipe systems or by letting them seep in. In the case of waters contaminated with heavy metals, they are added to the water also through pipes or added by hand.

The method of the invention will be explained below by examples.

EXAMPLE 1
(For Comparison)

5 grams of a soil contaminated with 1000 mg/kg of lead chromate were placed in a vessel that could be sealed air-tight.

The soil had a light brown color. An aqueous solution (4 ml) of about 40 mg of sodium acetate, 5 mg of sodium ammonium hydrogen phosphate and 20 mg of wettage sulfur were pipetted into the vessel filled with the contaminated soil and then the vessel was sealed shut. The vessel was let stand for eight weeks at room temperature. At the end of this time the soil had been turned black by the formation of lead sulfide.

This example shows that the population of microorganisms present in the soil can be stimulated by appropriate treatment to form hydrogen sulfide, which reacts with lead chromate to form lead sulfide.

EXAMPLE 2

The procedure of Example 1 was repeated, but in this case 1 ml of an aqueous suspension of *Saccharomyces cerevisiae* (baker's yeast) with a cell density of $10^5$ cells per ml was added. After only 7 days, a blackening appeared with the same intensity that had been reached in Example 1 after 8 weeks.

EXAMPLE 3

10 g of a quartz sand with about 200 mg of different heavy metal compounds, such as lead oxide (PbO), cobalt salts and nickel salts, were placed in a vessel that could be sealed air-tight, and 4 ml of an aqueous solution of 30 mg of glycerin, 5 mg of sodium ammonium hydrogen phosphate and 20 mg of wettable sulfur were added. Then 1 ml of a suspension of *Saccharomyces cerevisiae* (baker's yeast) with a cell density of $10^8$ cells per ml was added with a pipette, the vessel was sealed, and after one hour a decided blackening was seen.

What is claimed is:

1. A method for decontaminating waters or soils containing heavy metals, said method comprising adding viable yeast to the waters or soils to be decontaminated, forming hydrogen sulfide by the viable yeast, optionally allowing other microorganisms present in the waters or soils to which the viable yeast has been added to form hydrogen sulfide, and reacting the so formed hydrogen sulfide with heavy metals to form metal sulfides.

2. Method according to claim 1, wherein inorganic nutrients or buffering salts are added to the waters or soils to be decontaminated.

3. Method according to claim 1, wherein biologically usable compounds are added to the waters or soils to be decontaminated as a carbon source and extra sulfur sources are also added to the waters or soils if not sufficently present in such waters or soils.

4. Method according to claim 1, wherein the viable yeast is added in the form of a pre-culture with an elevated cell density.

5. Method according to claim 1, which is for decontaminating soils, and wherein a surface seal is applied to the soil that is to be decontaminated.

6. Method according to claim 1, which is for the treatment of waters contaminated with heavy metals, and wherein a porous support coated with sulfur vapor and populated with microorganisms is added to the waters.

* * * * *